March 22, 1932.  O. N. GREDELL  1,850,545
GRAIN BLOWER
Filed Aug. 8, 1929  2 Sheets-Sheet 1

INVENTOR
Otto N. Gredell
BY Arthur C. Brown
ATTORNEY

March 22, 1932. O. N. GREDELL 1,850,545
GRAIN BLOWER
Filed Aug. 8, 1929   2 Sheets-Sheet 2
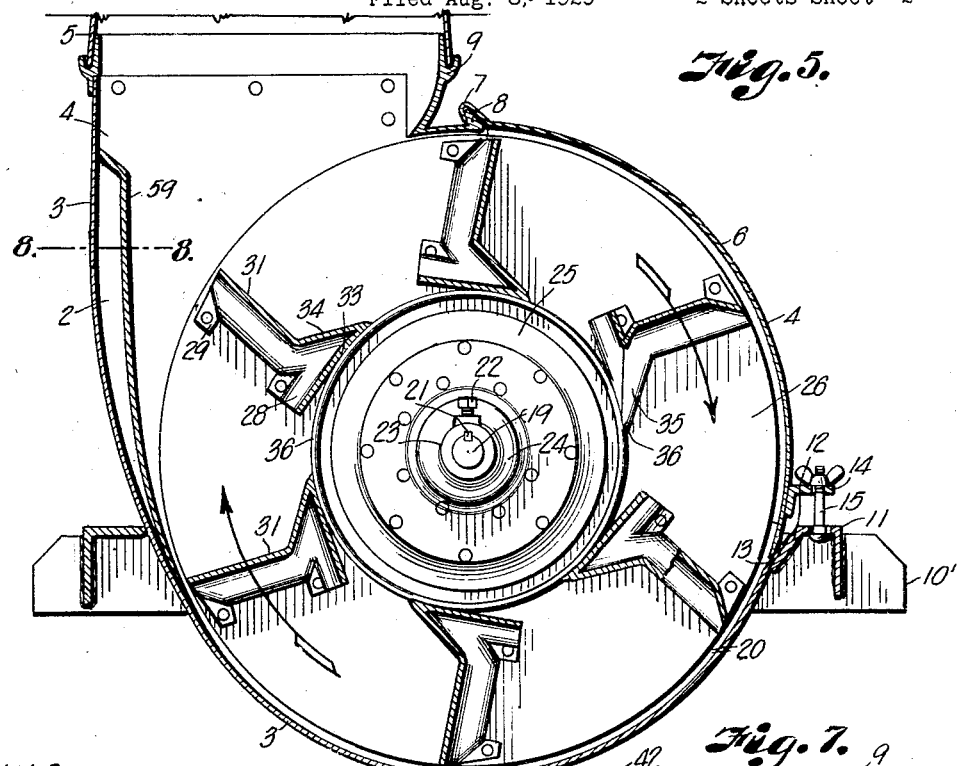
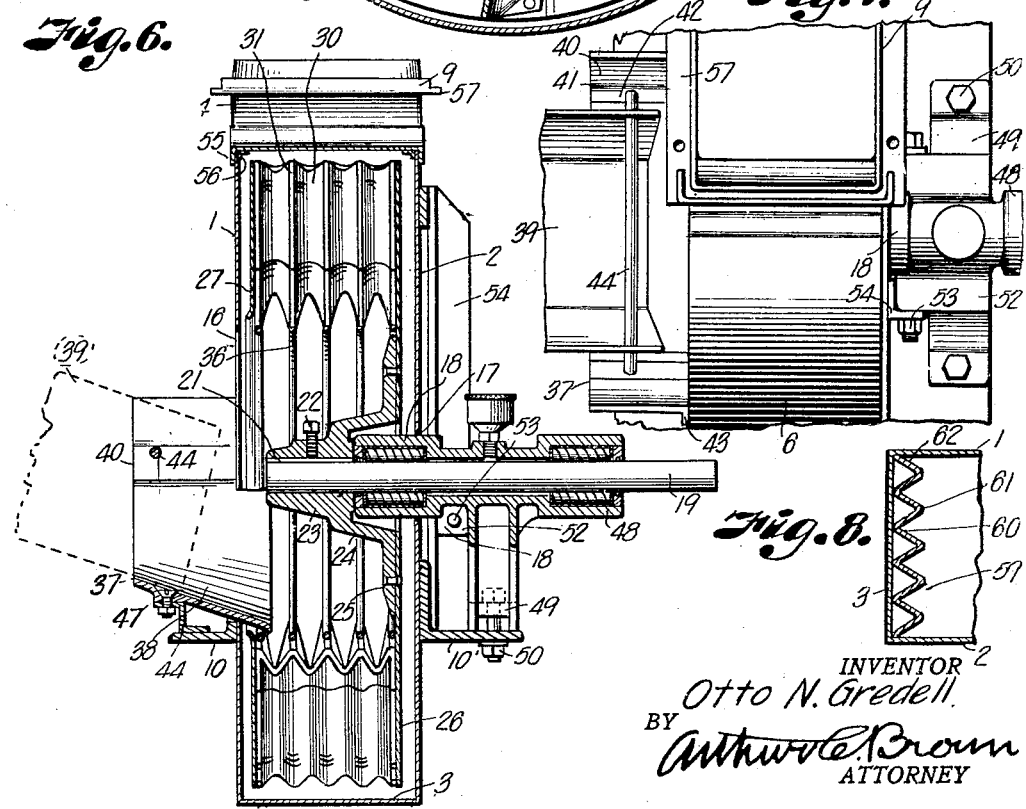
INVENTOR
Otto N. Gredell.
BY Arthur E. Brown
ATTORNEY Patented Mar. 22, 1932

1,850,545

UNITED STATES PATENT OFFICE

OTTO N. GREDELL, OF KANSAS CITY, MISSOURI, ASSIGNOR TO STANDARD STEEL WORKS, OF NORTH KANSAS CITY, MISSOURI, A CORPORATION OF MISSOURI

GRAIN BLOWER

Application filed August 8, 1929. Serial No. 384,293.

My invention relates to grain blowers and has for its principal object to minimize the damaging effect on grain kernels due to impact thereof with blower blades and fan housing, and to increase the grain propelling efficiency of a blower.

In grain blowers as ordinarily constructed, the blades strike incoming grain kernels with relatively great force due both to the inertia of the kernels and the velocity of the blades, thus not only tending to crack the kernels but to knock the kernels against the walls of the fan housing and into angular directions with reference to the movement of air currents induced by the blades.

Further and particular objects of my invention therefore are to enable the fan blades to overcome the inertia of the grain kernels gradually, to enable the blades to directly confer motion on the kernels substantially in the direction in which the air currents are moving without striking the kernels, and to increase the proportion of kernel movement conferred by the blast created by the blower.

A further particular object of the invention is to form fan blades, a fan housing, an inlet, and operating members in such a way as to minimize opportunity for perpendicular impact of blower members against grain kernels.

In accomplishing these and other objects of my invention, I have provided improved details of structure, the preferred forms of which are illustrated in the accompanying drawings, wherein:

Fig. 5 is a central longitudinal section of the blower.

Fig. 6 is a central vertical cross section of the blower illustrating the feed chute in dotted lines.

Fig. 7 is a fragmentary plan view of the members shown in Fig. 6.

Fig. 8 is a section on the line 8—8, Fig. 5.

Figure 1:
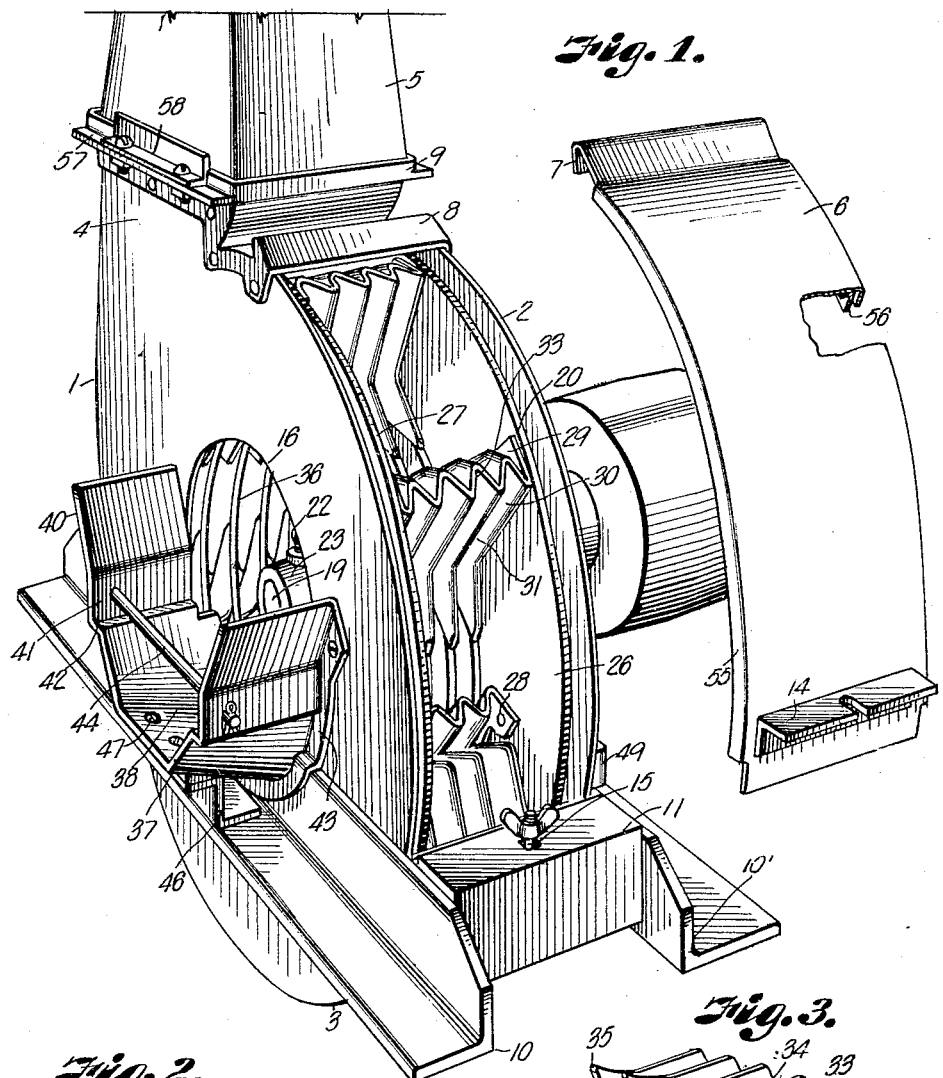
Fig. 1 is a perspective view of a blower embodying my invention, the cover being removed to disclose the interior structure, a grain conduit connected with the blower being shown fragmentarily.

Referring in detail to the drawings:

1 and 2 designate parallel spaced walls having arcuate edges connected through a greater portion of their extent by a rear and bottom wall 3 and adapted, as later described, to form a housing having a rectangular outlet portion 4 connected with a conduit 5 through which grain is to be elevated.

One portion of the arcuate periphery of the housing is open and covered by a plate 6 having a hook-like upper edge 7 adapted to engage a projecting flange 8 on a casting 9 positioned on the rectangular mouth of the housing and having channels or recesses extending at opposite ends to receive the lower edges of the outlet conduit 5.

The housing is supported by spaced angle members 10 and 10' having vertical flanges welded to the side walls 1 and 2. A channel member 11 spanning the space between the angles adjacent the opening of the housing is provided with an angularly extending leaf 12 to receive the slightly outbent end 13 of the wall 3, whereby the lower end of the cover 6 may be moved over the edges of the walls 1 and 2 into engagement with the lower wall portion 13.

A notched latching angle 14 welded to the cover is adapted to be attached by a thumb screw 15 anchored in the channel member 11 for securing the cover in functioning position.

The outer wall 1 of the housing is provided with a relatively large axial inlet opening 16 and the opposite or inner wall 2 is apertured at 17 sufficiently to receive the end 18 of an overhanging bearing member secured to the housing as presently described, for supporting a fan-operating shaft 19.

One end of the shaft 19 projects beyond the bearing in the housing to a point adjacent the plane of the housing wall 1 and a fan member 20 is mounted on this projecting end of the shaft, being keyed thereto by a spline 21 and locked by a screw 22.

The fan member comprises a hub 23 having a conical rearwardly extending portion 24 from which a radial disk-like annulus or flange 25 extends parallel with the housing walls adjacent the rear wall 2, and a plate or disk 26 is fixed as by riveting to the rear face of the flange, the plate being apertured and the inner periphery of the annulus 25 being spaced suitably from the shaft to admit the bearing portion 18 substantially to the center line of the housing.

Figure 2:
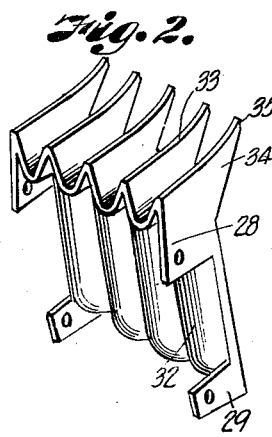
Fig. 2 is a perspective view of the rear surface of a fan blade member.
Figure 3:
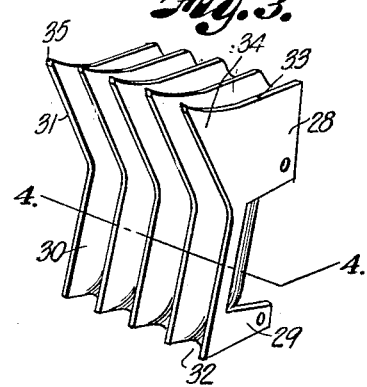
Fig. 3 is a perspective view of the front or grain engaging face of the fan blade member.

The fan member further includes an outer annulus or disk-like plate 27 having an aperture substantially the same size as the aperture in the housing wall 1, the plates 26 and 27 being connected by blade members illustrated in Figs. 2 and 3 having ears such as 28 and 29 provided with openings to receive fastening devices for securing the blades to the plates, thus serving to support the apertured plate 27 from the hub-supported plate 26.

Figure 4:
Fig. 4 is a section on the line 4—4, Fig. 3, illustrating the tapering pockets in the face of the fan blade.

The blades are corrugated longitudinally to form a plurality of radially extending pockets 30 and forwardly extending relatively thin edges 31. Each blade may comprise a single casting or sheet of material indented to provide the rib-like formation having preferably tapering walls diverging from the edges 31 of the ribs which form the common advance edges of adjacent pockets. The outer ends of the pockets are preferably open as illustrated at 32 in Fig. 3, and the bottoms of the pockets may be formed on transverse curves as indicated in Fig. 4 to avoid a sharp angle at the bottom of a pocket.

The length of a blade corresponds with the width of the annuli 26 and 27 comprising the walls of the fan so that the inner edge of the blade is spaced substantially from the shaft and hub to permit grain delivered to the housing to move freely toward the wall 26 of the fan. Said inner edge of the blade is also provided with pocket elements formed with ridges 33 extending in the same vertical planes as the ridges of the radial pocket portions but substantially at right angles thereto, and tapering walls forming grooves or channels and comprising an assembly of open ended pockets projecting rearwardly from the pocket forming portions of the blade previously described.

The diverging walls forming the two sets of pockets in each blade are substantially continuous from one set to the other and are extended forwardly to form projecting wings 34 and points 35.

Wires 36 having ends connected to form rings are mounted on the ridges 33 of similar pocket portions of the several blades, to prevent the points 35 from directly contacting and delivering blows to grain kernels.

A spout member 37 is mounted in the opening of the wall 1 with an inclined floor portion 38 extending inwardly of the housing and beyond the apertured plate 27 of the fan for delivering grain into the space between the plates 26 and 27. A supply or feed chute 39 is adapted to be located with its lower end or mouth on said spout floor.

The spout member is provided with side wings 40 extending vertically adjacent the edges of the opening including offset portions 41 forming shoulders or ledges 42 which space the chute member from the offset wing portions 41. Channels are thus formed on each side of the chute for conducting air into the housing adjacent the lower edge of the chute. Flanges 43 on the edge of the spout member may be attached to the housing wall 1 and a rod 44 may be employed for securing the end of the chute to the spout member.

A Z-shaped bar 46 is welded to the angle 10 to receive a bolt 47 for stabilizing the spout member.

The overhanging bearing above referred to includes an outer portion 48 similar to the inner portion 18, lateral wings or flanges 49 adapted to be attached by bolts 50 to the angle 10', and ears 52 apertured to receive bolts 53 extending in flanges of spaced angles 54 arranged vertically on each side of the bearing an welded to the housing wall 2.

The cover 6 preferably includes turned edge flanges 55 engageable with the outer faces of the walls 1 and 2 and flanges 56 welded to the body of the cover and spaced from the edge flanges to form channels for mounting the cover in snug engagement with the edges of the housing walls.

The casting 9 above referred to further includes side lateral flanges 57 on each side for supporting angles 58 fixed to the walls of the conduit and adapted to secure the conduit against the inner flanges of the casting.

In order to prevent kernels moving from the fan from striking the housing wall 3 in such a manner as to cause damage to the kernels, I provide a corrugated surface for the wall, preferably by installing in the housing a guide plate 59 having an arcuate lower end and longitudinal indentations forming a plurality of tapering grooves or channels 60 similar to the pockets of the fan blades.

The lower edge of the plate engage the wall 3 adjacent the area in which the rear portion of the wall diverges from the circle on which the bottom portion is formed, and is tapered to merge into said wall. The plate is positioned substantially vertically and the indentations thus extend substantially parallel to the axis of the outlet. The channels 60 taper from the lower unindented edge of the plate to the upper edge thereof so that their depth increases upwardly.

The rib-like indented portions of the plate forming the bottoms of the channels lie against the rear portion of the wall 3, while the ribs or ridges 61 dividing the channels diverge upwardly from said rear portion.

The plate is preferably provided with channels corresponding to pockets in the faces of the blades, and the ridges 61 of the plate are preferably in the planes of the edges 31 of the blade pockets, whereby kernels moving from the pockets toward the rear portion of the wall 3 will tend to enter the grooves and slide over the taper walls thereof in their passage toward the conduit 5.

Flanges 62 on the vertical edges of the plate are preferably back bent outwardly from the center line of the plate and engaged in the angle between the side walls 1 and 2 and the wall 3 to stabilize the plate and to effect location of the channels in receiving relation with the blade pockets.

In operating a blower constructed as described the grain is delivered in a stream into the housing between the parallel walls of the fan. Since the fan will be revolving at a relatively high velocity, grain kernels falling from the stream may be encountered by one or another portion of a fan blade.

Kernels that fall upon the elongated upper edge pockets of a blade will strike the same with relatively slight force due only to gravity and frictionally engaging the tapering walls and bottom of the pockets, will tend to be carried forward and thus will be given an initial movement in the direction of the currents of air induced by the blower.

Kernels falling between the circumferentially spaced blades may be slidingly engaged between taper walls of the pocket members and their inertia will thus be gradually overcome and the blades will be prevented from delivering a blow to the kernels.

The first kernels that enter the pockets by sliding over the taper walls thereof may be temporarily retained and deposited in the bottoms of the pockets and form cushions to receive kernels later encountered by the blades due to the relatively small area of the bottoms of the pockets and the fact that these bottoms are curved. Relatively few kernels will receive a direct blow from any portion of a blade and the opportunity for delivering such a direct blow is reduced by the fact that the bottoms of the pockets may be covered by kernels that have slid over the taper walls of the pockets to form cushions therein.

The continued revolution of the fan blades to which kernels have been delivered as described will effect centrifugal delivery of supported kernels toward the conduit.

Attention is further called to the wires mounted on the inner ribs or edges of the tangential pocket members, which guard the points of the pocket portions and receive kernels in a sliding manner to prevent the points from delivering direct blows to kernels which they may encounter.

Many of the kernels delivered by the blades and air currents toward the conduit might strike the wall 3 with relatively great force, and the impact would tend to break the kernels. The guide plate 59 however, provides slanting surfaces to receive the kernels. Whereas the indented blades encounter the kernels slidingly and avoid delivering direct blows thereto to divert their course, the moving kernels encounter the indented plate and are gradually diverted upwardly toward the conduit.

What I claim and desire to secure by Letters Patent is:

1. In a device of the character described, a fan blade member comprising a plurality of pocket-forming portions having curved bottoms terminating in outwardly tapering walls having thin advance edges between said pocket forming portions projecting forwardly in the direction of rotation of the blade.

2. In a device of the character described, a fan blade member comprising a plurality of portions forming pockets having taper walls, and adjacent walls having common edges projecting forwardly in the direction of rotation of the blade.

3. In a device of the character described, a fan blade member comprising a plurality of portions forming pockets having taper walls, adjacent walls having a common edge projecting forwardly in the direction of rotation of the blade, and inner ends projecting forwardly from said pockets.

4. In a device of the character described, a fan including a plurality of blades each including a portion having walls inclined angularly to the direction of movement of the blade, the inner end edges of the walls being spaced from the axis of the fan, and a guard member attached to said inner end edges of the walls.

5. In a device of the character described, a fan including a plurality of blades, each including a plurality of pocket-forming walls having advance edges moving in the direction of movement of the blade and inner edges spaced from the axis of the fan, and guard members including a wire bent to circular form and mounted on the inner edges of said walls.

6. In a grain blower, a housing having a closed side wall and a grain inlet in the opposite side wall, a bearing mounted in the closed wall, a shaft supported by the bearing and projecting in the housing toward the inlet, and a fan fixed to the shaft and comprising a closed side wall and an open side wall adjacent the housing inlet, and blades fixed to the fan walls, each having longitudinally extending indentations forming pockets with tapering sides.

7. In a grain blower, a housing having a closed side wall and a grain inlet in the opposite side wall, a chute mounted at the inlet and adapted to deliver grain below the axis of the housing, a bearing mounted in the closed wall, a shaft supported by the bearing and projecting in the housing toward the inlet, and a fan fixed to the shaft and comprising a closed side wall, an open side wall adjacent the housing inlet, and blades fixed to the fan walls having longitudinal indentations forming parallel pockets with tapering sides.

8. In a device of the character described including a housing having a closed side wall and an inlet in the opposite side wall, a chute mounted at the inlet and adapted to deliver material below the axis of the housing, a bearing mounted in the closed wall, and a shaft supported by the bearing and projecting in the housing toward the inlet, a fan fixed to the shaft and comprising a closed side wall, an open side wall adjacent the housing inlet, and blades fixed to the fan walls having longitudinal tapering indentations.

9. In a device of the character described including a housing having a closed side wall and an inlet in the opposite side wall, and a shaft projecting in the housing toward the inlet, a fan fixed to the shaft and comprising a closed side wall, an open side wall adjacent the housing inlet, and blades fixed to the fan walls each comprising a plate having indentations forming pockets having tapering sides, said plates having forwardly extending inner end portions and arcuate inner edges spaced from the axis of the fan.

10. In a grain blower, a housing having a closed side wall and a grain inlet in the opposite side wall, a bearing mounted in the closed wall, a shaft supported by the bearing and projecting in the housing toward the inlet, and a fan fixed to the shaft and comprising a closed side wall and an open side wall adjacent the housing inlet, and blades fixed to the fan walls each comprising a plate having longitudinal indentations forming parallel pockets having tapering sides, and plates having forwardly extending inner end portions and arcuate upper edges.

11. In a grain blower including a housing and a shaft, a fan mounted on the shaft and comprising a plurality of blade members, each including a plurality of pocket portions extending radially, and a plurality of pocket portions extending substantially parallel with tangents to the shaft.

12. In a device of the character described including a housing and a shaft, a fan on the shaft comprising a plurality of blades, each including a pocket presented in the direction of movement of the blade, and a pocket presented toward the axis of the shaft.

13. In a device of the character described including a housing and a shaft, a fan including an inner wall parallel with the housing and fixed to the shaft, fan blades fixed to said wall, and an outer apertured wall fixed to the fan blades, said fan blades each including a plurality of pocket-forming portions having common edges extending in the direction of rotation of the fan, and rings mounted on corresponding pocket portions of the several fan members.

14. In a device of the character described including a housing and a shaft, a fan including an inner wall parallel with the housing and fixed to the shaft, fan blades fixed to said wall, an outer apertured wall fixed to the fan blades, said fan blades each including a plurality of pocket-forming portions having common advance edges extending in the direction of rotation of the fan and common inner edges spaced from the axis of the fan, and rings mounted on corresponding pocket portions of the several fan blades for guarding the points of juncture of advance edges with inner edges of said pocket-forming portions.

15. In a device of the character described, a fan housing having an outlet and including a rear wall leading to the outlet provided with an indentation arranged substantially parallel to the axis of the outlet.

16. In a grain-blower including a housing having an outlet, and a fan in the housing, a guide plate in the housing in receiving relation with the fan having indentations forming guide channels for grain moved by the fan toward said outlet.

17. In a grain blower, a housing having an outlet, a fan in the housing including a blade having a pocket, and a guide plate in the housing leading to said outlet and provided with a channel arranged substantially perpendicularly to the axis of the fan and in receiving relation with said pocket.

18. In a grain blower including a housing having side walls and an arcuate rear wall leading to an upwardly directed outlet, and a fan in the housing, a guide plate having edge flanges engaging the side walls of the housing and upwardly deepening indentations forming ribs, said ribs being engaged with the rear wall of the housing.

19. In a device of the character described, a fan including a blade having pocket-forming walls having arcuate inner end edges arranged circumferentially to the axis of the fan and in spaced relation therewith.

20. In a grain blower or the like, a fan including a side plate and a blade having a side edge secured to said plate and including pocket forming walls having arcuate inner end edges arranged circumferentially to and in spaced relation with the axis of the fan.

21. In a device of the character described, a fan including a blade having walls forming a pocket and having inner end edges spaced from the axis of the fan, and guard means including a member mounted on said blade and extending from said end edges in the direction of movement of the fan.

22. In a grain blower including a fan having a blade provided with walls on the front face of said blade having advance edges and inner end edges meeting in points, arcuate guards mounted on said end edges extending forwardly from said points with respect to the direction of movement of the fan.

23. In a device of the character described, a fan housing having an outlet and including a wall leading to said outlet having channels increasing in depth toward said outlet.

24. In a grain blower, a fan blade provided with a plurality of parallel radially extending pockets having outwardly and forwardly tapering side walls, the side walls of adjacent pockets forming triangle shaped advance edges for diverting grain into said pockets.

In testimony whereof I affix my signature.

OTTO N. GREDELL.